Nov. 5, 1929.　　　　J. B. HENDERSON　　　　1,734,129
SUPPORT FOR GYROSCOPES AND OTHER SENSITIVE ELEMENTS
Filed June 19, 1926
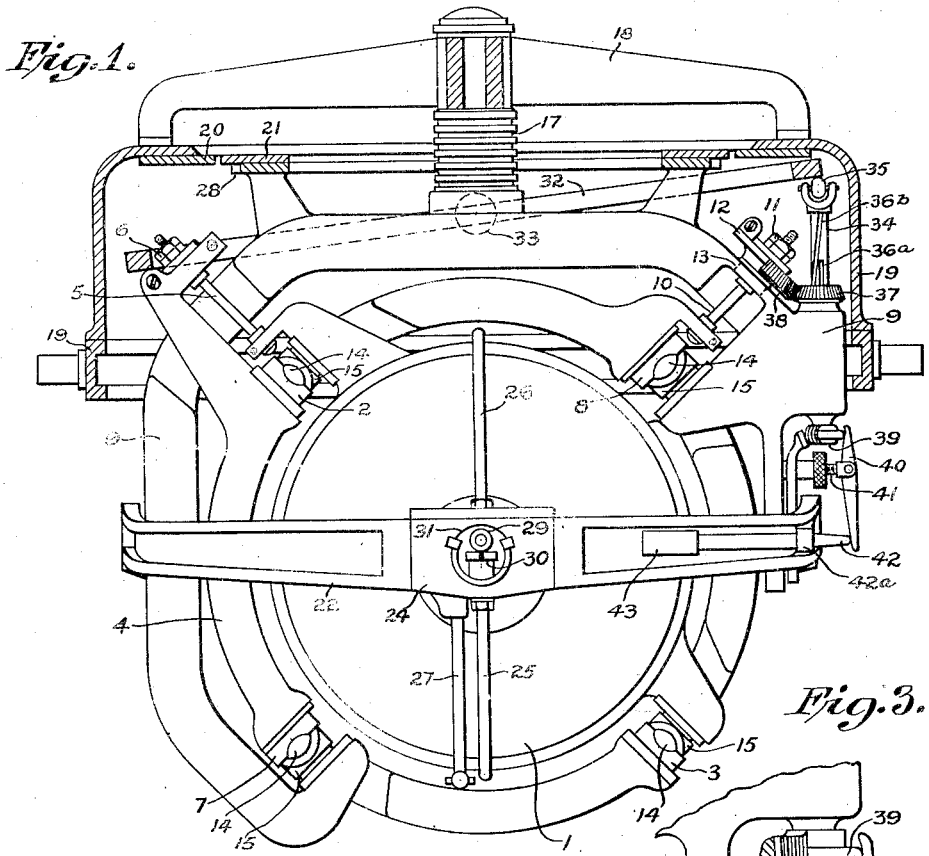
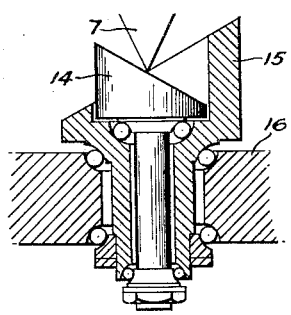
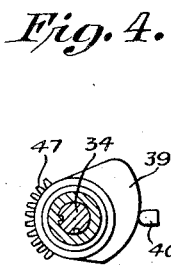
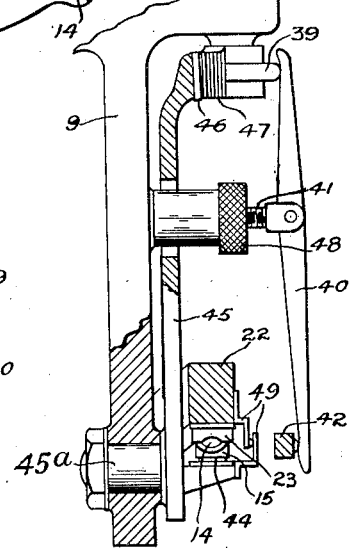
INVENTOR
James B. Henderson
BY *Moakley & Gill*
ATTORNEYS Patented Nov. 5, 1929

1,734,129

UNITED STATES PATENT OFFICE

JAMES BLACKLOCK HENDERSON, OF BLACKHEATH, ENGLAND

SUPPORT FOR GYROSCOPES AND OTHER SENSITIVE ELEMENTS

Application filed June 19, 1926, Serial No. 117,179, and in Great Britain June 22, 1925.

My invention relates to methods of supporting gyroscopes such as those used in gyro-compasses, where freedom about a vertical axis combined with absence of friction are desirable, but it also applies more generally to the suspension of any sensitive element which has to be pivoted for movement about a vertical axis with a minimum of friction. The difficulties to be overcome in such a mounting are greatest when the apparatus is subject to external reciprocating stresses and I therefore illustrate the invention in a typical application to a gyro-compass for use on board ships or aircraft, where such stresses due to rolling and pitching of the vessel are fully exemplified.

The common practice of mounting gyroscopes upon gimbals, one gimbal axis being normally vertical, and of employing ball-bearing trunnions for the pivots of that axis, the outer race of the ball bearing being carried by a follow-up element, is open to the great objection that the outer race, by following the gimbal ring which carries the inner race, defeats one of the objects for which the bearing is expressly intended, since the follow-up motion effects that the balls bear continuously upon the same spots in the races, and being continuously subjected to stresses due to vibration, hunting of the follower and movements of the ship, rapidly form indentations in both races, so that the bearings soon cease to function as free bearings. Even if this were not the case, it is well known that ball bearings are inferior to knife-edges in eliminating friction. Vertical knife-edge bearings, however, though not impossible, introduce considerable mechanical disadvantages where the whole apparatus is subject to movement, but these are overcome and all the advantages of knife edge supports retained by the novel method of support herein described.

To take the typical case of a gyro compass, the gyroscope must have freedom to oscillate about a vertical and a horizontal axis, absence of friction about both axes being a matter of prime importance. Now it is known that a gyroscope suspended on two gimbal axes at right angles to each other and with its rotor axis at right angles to both, has complete freedom to move its rotor axis in all directions. There is therefore no necessity for the gimbal axes to be vertical and horizontal. So long as they are mutually perpendicular they may lie in any direction in the normal plane of rotation of the gyroscope without interfering in the slightest degree with the freedom of movement of the gyroscope about any other axes in that plane, e. g. about a horizontal and a vertical axis. That is to say the gyroscope will have unimpaired freedom to oscillate about a horizontal axis due to the earth's rotation, and to precess in azimuth about a vertical axis in response to the application of gravity control torques although neither of these axes is a trunnion axis.

In the present invention therefore I utilize this principle in order to avoid the necessity for having a vertical trunnion axis with its attendant disadvantages. I support the gyroscope on two gimbal trunnion axes, both inclined to the vertical at acute angles, preferably 45°, and as knife edge trunnions operate satisfactorily up to about 60° inclination to the horizontal if fitted with suitable end constraint, I make all the trunnions knife edges and support the end thrust due to the weight of the suspended element preferably by filars along the trunnion axes. I may also arrange the torsional characteristics of these filars, or of some of them, to serve other purposes to which I shall refer later.

In the attached drawings I show the application of my invention to a gyro compass as a typical example, but I may use the system, mutatis mutandis, in other types of apparatus, gyroscopic or otherwise.

Fig. 1 is a north elevation of a compass, supposed to be mounted on a ship, the compass being viewed from forward when steaming north, the speed compensation mechanism being shown as set for maximum speed.

Fig. 2 is an enlarged sectional view of the self-aligning V-blocks of the knife-edge trunnions.

Figs. 3 and 4 are enlarged views, part sectioned, of the mechanism for applying compensating torques and adjustments about the horizontal axis of the gyroscope.

In Fig. 1 the gyroscope in its casing 1 is supported on knife edge trunnions 2 and 3 in a normally vertical gimbal ring 4, the trunnion axis being at 45° to the horizontal, and the component weight of the gyroscope parallel to the knife edge being supported by the filar 5 from the adjustable torsion head 6 of conventional type carried by the gimbal ring. The gimbal ring is in turn suspended on knife edge trunnions 7 and 8 on the follow-up element 9, the component weight of both gyroscope and gimbal ring parallel to the knife edge being taken by the filar 10 and adjustable torsion head 11, the latter being carried by a rotatable member 12 supported in a bearing 13 on the follow-up element 9 coaxial with the axis 7, 8. The filars 5 and 10 are preferably multi-strand wires to give the required strength and small torsional stiffness.

The knife edges of all the four trunnions are mounted on the gimbal ring in such a manner that they can be accurately machined in pairs by a single operation for each pair of edges, while the V-blocks of self-aligning type are carried by the gyroscope and follow-up element respectively. The type of V-block used is shown in Fig. 2. It consists of two concentric cylindrical blocks 14 and 15, housed one inside the other on suitable bearings, the outer block being similarly mounted on the fixed support 16. The upper surfaces of the two blocks are equally and oppositely inclined to the longitudinal axis and by turning the inner block round through 180°, the two blocks can be set up in a jig and ground true together at one operation. Both blocks being free to turn independently and the knife edges being machined in pairs, the two bearings of each axis form an ideal self-aligning bearing. A further advantage of this type of V-block is its long life without regrinding. Through wear the blocks will become marked or worn along the line of contact of the knife edges, but a fresh true surface can be speedily obtained by increasing the size of balls in the bearings between the two blocks or by inserting washers if plain bearings are used.

The follow-up element 9 is mounted in customary fashion by a vertical bearing 17 in the spider 18 which is supported by the ring frame 19, the last named being mounted on athwartships trunnions in the usual binnacle and gimbal ring which are not shown. The ring frame 19 supports a lubber ring 20 for reading the ship's bearing on a compass card 21 mounted on the follow-up element 9.

The gravitational and damping control of the gyroscope may be of any suitable type but for purposes of illustration I show them as being furnished by the level 22 pivoted on knife edges 23 (see Fig. 3) resting on V-blocks of the type already described, the east block being carried by the follow-up element and the west block, seen in Fig. 3, by an arrangement which I shall describe later. The level comprises two closed vessels 24, one on each side of the gyroscope, partially filled with fluid and connected by a communicating pipe 25 of restricted diameter beneath the gyroscope and an air passage 26 above the surface of the fluid. The level also carries a bracket 27 by which it is constrained to the gyroscope at a point eccentric to the vertical axis, as described in my co-pending application Serial No. 313,537, filed July 26, 1919, the connection being either rigid or elastic and being disposed to the east side of the central line. The trunnion axis of the level is approximately in line with the horizontal diameter of the gyroscope casing and passes through its centre of suspension, which is the intersection of the two trunnion axes 2—3 and 7—8. The gyroscope is in neutral equilibrium about its centre of suspension and the level is also in neutral equilibrium about its trunnion axis when the fluid is equally distributed and flow stopped. When the level is connected to the gyroscope by the bracket 27 and the liquid is free to flow from one side of the level to the other, the combination is in unstable equilibrium due to the fluid and the gyroscope will seek a position of stability on the meridian rotating in the opposite direction to the earth.

The follow-up element 9 is kept in phase with the gyroscope in azimuth by means of the usual follow-up motor, not shown, carried by the ring frame 19 and having a toothed pinion meshing with the rack 28 on the follow-up element. The motor is a reversible D. C. motor controlled by contacts, operating in the customary way by relative movements in azimuth between the gyroscope and follow-up element. In the past the gyro contact has usually been mounted on the gimbal ring 4, but in the present invention this is inadvisable since the gimbal ring does not remain vertical nor in phase with the gyroscope in azimuth. For that reason, and to avoid the introduction of an additional gimbal ring to carry the contact, I may mount the gyro contact on the gyro itself. In Fig. 1 I have adopted as a simple example for purposes of illustration, a trolley contact 29 carried on the gyro case, co-operating with a two-part commutator 30 carried by the level, both contacts being visible and accessible through a cylindrical tube 31 passing through the vessel 24 of the level. The roller 29 is kept pressed against the commutator by a light spring and both contacts are attached to their supports by spring clips so as to be easily detached for cleaning. As the friction at such a distance from the vertical axis may possibly be too great I may diminish the lever arm by mounting the contacts at the top of the gyro case, say, mounting the roller on the case at a short distance from the vertical axis and the commutator on the air pipe 26 or another bridge or bracket carried by the level. The essential point to notice is that one contact should be carried by the gyro case and not by the gimbal ring, and as the gyro tilts relatively to the follower, the other contact should be carried by the level or any other member moving in azimuth with the follower and in elevation with the gyro, unless the gyro contact is mounted on the horizontal diameter of the gyro case. When the connection between the gyro case and the bracket 27 is elastic so as to permit the level to tilt further than the gyroscope, the commutator, if carried by the level, should be at right angles to the direction of relative tilt in order that the tilt will not produce a displacement of the follower in azimuth, and the roller or commutator or both must be so mounted as not to arrest this relative motion of the level.

In order to apply to this compass the torques required to compensate for speed and course of the ship, as described in my copending applications Serial Nos. 427,424 filed Nov. 30, 1920, and 576,480 filed July 21, 1922, I make use of the constraining filar 10, in conjunction with some additional mechanism shown in Figs. 1 and 3. A cam ring 32 is pivoted on the outer frame 19 on a fore-and-aft axis 33 and is tilted to an angle whose tangent is proportional to the speed of the ship. The follow-up element 9 carries a spring plunger 34 with a roller 35 bearing against the under side of the cam, so that the elevation of the plunger is proportional to the N—S component of the ship's speed. As shown, the ship is steaming north and the cam is at its maximum tilt for full speed. The plunger 34 has two grooves cut in it, one of them 36$^a$ being straight and axial and engaging with an internal pin or feather in the follow-up element so that the plunger cannot turn round in its seating, while the other, 36$^b$, is helical and engages with a feather on the inside of the bevel wheel 37 so that as the plunger moves up and down the bevel wheel is turned and rotates the bevel sector 38 attached to the rotatable member 12. As the torsion head 11 is attached to the member 12, the result is to twist the filar 10 by an amount proportional to the N—S component of the ship's speed, thus applying a corresponding torque to the gyroscope about the axis 7—8. This torque can be resolved into two component torques about the vertical and horizontal axes respectively, of which only the former is required for compensation purposes and the latter must be annulled. In addition a torque about the horizontal axis is introduced by a change of speed along the meridian due to the fluid displaced in the level during the change. This torque is in the direction opposite to the horizontal component torque due to the adjustment of the filar 10 and is greater than it. I balance both these torques together by applying a counter torque to cancel their resultant, using any suitable mechanism for introducing torques about the horizontal axis, such as the movement of a weight.

The fluid displaced in the level during an acceleration would flow back again after the acceleration had ceased and so disturb the compass, to obviate which I adjust the level during the acceleration so as to change its zero in proportion to the change of meridional speed, so that the fluid is maintained throughout on the true horizontal level and has no tendency to flow back on termination of the acceleration. A necessary accompaniment of this is that the amount of fluid displaced during an acceleration shall be proportional to change of speed and not proportional to the acceleration. For this reason the flow is restricted or throttled by the small bore tube 25 or by a suitable valve to the extent required to achieve this result.

To produce these torques and adjustments about the horizontal axis a continuation of the helical slot 36$^b$ or another slot cut in the lower end of the plunger 34 engages with an internal feather on a rotatable cam 39, or the cam may be mounted on a sleeve which also carries the pinion 37. The cam bears against the upper end of a pivoted lever 40 (Fig. 3) carried by an adjustable pillar 41 on the follow-up element 9, the tail of the lever pressing on the end of a bell-crank lever 42 (Fig. 1) which is pivoted on a vertical axis 42$^a$ on the level, the other end of the bell-crank carrying a weight 43 in front of the gyro. The point of contact between the levers 40 and 42 is on the trunnion axis of the level and springs are inserted at the most convenient points to keep the various parts of the mechanism continuously in contact with each other. Any change in the N—S speed, by elevating or depressing the plunger 34, produces rotation of the cam 39 and a corresponding N—S movement of the weight 43, thus producing a torque about the horiontal axis of the gyro in proportion to the change. I arrange the mechanism so that this torque will exactly annul the undesired torques about the horiontal axis introduced by the change of speed or by the other adjustments.

To adjust the zero of the level I mount the V-block 44 supporting the west knife-edge trunnion of the level on a crank 45$^a$ (Fig. 3) mounted on a horizontal bearing parallel with and slightly below the trunnion axis of the level and I connect the crank to the rotating cam 39 by means of the bevel sector 46 on the crank meshing with the bevel teeth 47 cut on the reverse side of the cam, as shown in plan in Fig. 4. Any movement of the adjustment mechanism is therefore accompanied by a small movement of the crank 45 proportional to the change of velocity, which shifts the level in the direction towards which the fluid is displaced by the acceleration, and the eccentric connection between the level and the gyroscope through the bracket 27 causes the level to tilt relatively to the gyro by an amount which I arrange to be just sufficient to maintain the free surfaces of the fluid in the two sides of the level continuously on the true horizontal plane.

Since the small counter torque applied to the gyro about its horizontal axis by these adjustments in order to balance the horizontal component of the torque in the filar 10 acts on the gyro through the eccentric bracket 27, it must produce a still smaller component torque about the vertical. In the mechanism illustrated this component about the vertical acts in phase with the torque due to the twist in the filar 10 and is allowed for in calculating the stiffness of the filar and its angular twist.

The small torque about the horizontal axis required to keep the rotor axis horizontal at all latitudes may be applied by moving a weight on the gyro case, by shifting one of the trunnions of the level or by moving a weight on the level, which may be the weight 43. I have adopted the last-named method by making the pillar 41 adjustable in length by means of a micrometer screw, the milled head of which (48) carries on its face an appropriate scale of latitudes.

In the method of suspension described above the gyroscope is perfectly free to tilt about a horizontal axis due to the rotation of the earth, although it is not fitted with a horizontal axle about which this tilt takes place. That the gyroscope must tilt about a horizontal axis as the earth rotates will be more clearly realized when it is remembered that it is actually the horizontal plane which tilts while the gyroscope remains fixed in space, so that the relative movement between the two, i. e. the apparent tilt of the gyroscope, can only take place about the horizontal axis round which the plane has tilted. In considering questions of precession in response to applied torques, the position of the point of application of each torque relatively to the centre of support of the gyroscope, that is relatively to the intersection of the two knife-edge axes, determines the plane of action of the torque and the plane of the resultant precession. The suspension may for practical purposes be considered as the equivalent of a frictionless spherical bearing which supports the weight of the gyroscope and leaves it free to precess in any direction under the influence of torques or to stand still in space in the absence of torque.

When rotation of the earth produces a tilt of the gyroscope about a horizontal axis through its centre of suspension both trunnion axes of the gyroscope necessarily partake of the tilt, and the gimbal ring 4 is moved round the axis 2—3 relatively to the gyroscope and round the axis 7—8 relatively to the follow-up ring 9. That is to say the gimbal ring is thrown out of the plane of rotation of the gyroscope and its angular displacement round the two axes 2—3 and 7—8 produces a slight twist in each of the supporting filars 5 and 10. If the two filars have identical characteristics the torques for small angles of tilt are equal, and if the two trunnion axes are equally inclined to the horizontal the torques due to the two twisted filars produce a resultant torque about the horizontal axis alone, which is proportional to the tilt of the gyroscope and for which I make allowance in arranging the constants of the gravity control. For large tilts, relatively to the follow-up, such as may be produced by swinging of the compass in heavy weather, the two torques are not exactly equal and a small resultant torque about the vertical axis is introduced, but as this is a periodic and not a persistent unidirectional torque, its effect is negligible.

If the two trunnion axes are unequally inclined to the horizontal then the resultant torque, due to the twisted filars when the gyro tilts, acts about an axis which is inclined to the horizontal and so has a component about the vertical axis and one about the horizontal axis. The latter always acts in the same direction as a pendulous gravity control, i. e. in opposition to the gravity control in Fig. 1, while the former acts about the vertical axis in one direction or the other for a given tilt according to which trunnion axis is nearer to the horizontal. I may actually utilize this alternative construction in order to produce by this means the damping torque or gravity torque or both, by using stiffer filars than I would in the Fig. 1 arrangement, and in that case I can vary the relation between gravity control and damping by varying the disposition of the trunnion axes relatively to the horizontal (keeping the two trunnion axes always at right angles to each other) and/or by varying the stiffness of one or both of the filars. Such an arrangement, however, would not be as satisfactory as that of Fig. 1 where the instrument is subject to high tilts or heavy swinging, as such movements would produce undesirable variations in the controls.

The displacement of the gimbal ring produced by tilting of the gyroscope produces also a slight rotation of the gyro case round the rotor axis which may be of the order of 2° for a 20° tilt. The level does not partake of this movement so in order to prevent stresses on the level or gyroscope caused by relative movement between the gyro case and the bracket 27 it is advisable to allow a certain freedom in the connection between these two members. If the connection is rigid as regards movement in elevation, say by a pin on the gyro engaging in a hole in the bracket, or vice versa, then the hole should be a slot parallel to the trunnion axis of the level and the pin should preferably be a small roller.

To prevent endwise movement of the level on its knife edges I apply to it an end constraint either by means of short filars, similar to those used on the gimbal ring trunnion axis, or by other means such as I have shown in Fig. 3 where two small plates 49 are fixed to the supports of the knife edge and V-block respectively, one plate having a small ball-head pressing against the other plate exactly in line with the trunnion axis. The springs employed to keep the speed adjustment levers 40 and 42 pressed together are in themselves sufficient to furnish the end constraint for the west trunnion, but separate means, such as the plates 49 or a filar must be fitted to the east trunnion axis. I may fit the end plates 49 or filars at both sides of the level in addition to the adjustment levers 40 and 42, as they form a suitable means for leading electrical currents from the follower to the sensitive element, insulated where need be. I may also use the filars 5 and 10 for a similar purpose, also the various knife-edges of the gimbal ring, gyroscope and level, and also the levers 40 and 42.

I claim:—

1. A suspension for a sensitive element including a normally vertical gimbal ring, means for supporting said sensitive element from said gimbal ring to turn about an axis inclined to the horizontal and to the vertical, and means for supporting said ring to turn about another axis inclined to the horizontal and to the vertical.

2. A suspension for a sensitive element including a normally vertical gimbal ring, means for supporting said sensitive element from said gimbal ring to turn about an axis inclined to the horizontal and to the vertical, and means for supporting said ring to turn about another axis inclined to the horizontal and to the vertical, and means for constraining the parts against relative movement along said axes.

3. A suspension for a sensitive element including supporting means comprising an inclined knife edge trunnion and means including a filar support for preventing movement of said element along the inclined axis of said knife edge trunnion.

4. A suspension for a sensitive element comprising a normally vertical gimbal ring, trunnion means between said element and said ring for supporting said element to turn about an axis inclined to the horizontal and to the vertical, trunnion means for supporting said gimbal ring for turning about another inclined axis, and means for applying torques to the suspended element around axes distinct from the gimbal trunnion axes.

5. A suspension for a gyroscope comprising a normally vertical gimbal ring, trunnion means between said gyroscope and said ring for supporting said gyroscope along an axis inclined to the horizontal and to the vertical, trunnion means for supporting said gimbal ring along an axis inclined to the horizontal and to the vertical, and means including a torsional member aligned with the axis of one of said trunnion means for applying torques to said gyroscope about a horizontal and a vertical axis by twisting said torsional member.

6. A suspension for a gyroscope comprising a normally vertical gimbal ring, trunnion means between said gyroscope and said ring for supporting said gyroscope along an axis inclined to the horizontal and to the vertical, trunnion means for supporting said gimbal ring along an axis inclined to the horizontal and to the vertical, and means for applying counter torques about a horizontal axis.

7. The combination of a gyroscope, a normally vertical gimbal ring, trunnion means for supporting said gyroscope from said ring along an axis inclined to the horizontal and to the vertical, trunnion means for supporting said gimbal ring along another axis inclined to the horizontal and to the vertical, a follow-up element, and means for controlling the movement of said follow-up element including a pair of contacts moved into and out of engagement by relative movement of the gyroscope and follow-up element about a vertical axis.

8. The combination of a gyroscope, a normally vertical gimbal ring, trunnion means for supporting said gyroscope from said ring along an axis inclined to the horizontal and to the vertical, trunnion means for supporting said gimbal ring along an axis inclined to the horizontal and to the vertical, a follow-up element, and means for controlling the movement of said follow-up element including a pair of contacts moved into and out of engagement by relative movement of the gyroscope and follow-up element about a vertical axis, one of said contacts being carried by the gyroscope and the other of said contacts being pivoted on the follow-up element and moving with the sensitive element about a horizontal axis.

9. A suspension for a sensitive element comprising a normally vertical gimbal ring, trunnion means between said element and said ring for supporting said element to turn about an axis inclined to the horizontal and to the vertical, trunnion means for supporting said gimbal ring for turning about another inclined axis, means including a filar for preventing movement of said gimbal ring along the axis of the trunnion supporting means therefor, and means for applying torques to said filar and thereby applying torques to the suspended element around axes distinct from the gimbal trunnion axes.

10. A suspension for a gyroscope comprising a normally vertical gimbal ring, trunnion means between said gyroscope and said ring for supporting said gyroscope along an axis inclined to the horizontal and to the vertical, trunnion means for supporting said gimbal ring along an axis inclined to the horizontal and to the vertical, and means including a torsional member aligned with the axis of one of said trunnion means for applying torques to said gyroscope about a horizontal and a vertical axis by twisting said torsional member and for preventing relative movement along the axis of such trunnion means of the parts coacting there.

JAMES BLACKLOCK HENDERSON.